United States Patent
Tsai

(10) Patent No.: US 6,735,078 B2
(45) Date of Patent: May 11, 2004

(54) HIGH EFFICIENCY HEAT DISSIPATED POWER SUPPLY

(76) Inventor: Chung Yen Tsai, 235 Chung-Ho Box 8-24, Taipei (TW)

(*) Notice: Subject to any disclaimer, the term of this patent is extended or adjusted under 35 U.S.C. 154(b) by 0 days.

(21) Appl. No.: 10/309,371

(22) Filed: Dec. 5, 2002

(65) Prior Publication Data

US 2004/0027803 A1 Feb. 12, 2004

(30) Foreign Application Priority Data

Aug. 7, 2002 (TW) .................................. 91212160 U

(51) Int. Cl.⁷ .............................................. H05K 7/20
(52) U.S. Cl. ...................... 361/695; 165/80.3; 454/184
(58) Field of Search ................................ 361/687, 694, 361/695, 714–720; 439/485, 487; 165/80.3, 121–126; 454/184; 312/236; 363/141, 144, 147; 307/117, 150

(56) References Cited

U.S. PATENT DOCUMENTS

| | | | | |
|---|---|---|---|---|
| 4,967,155 A | * | 10/1990 | Magnuson | 324/212 |
| 5,831,847 A | * | 11/1998 | Love | 363/141 |
| 5,860,291 A | * | 1/1999 | Johnson et al. | 62/259.2 |
| 6,351,381 B1 | * | 2/2002 | Bilski et al. | 361/695 |
| 6,452,794 B1 | * | 9/2002 | Rumney | 361/686 |
| 6,525,936 B2 | * | 2/2003 | Beitelmal et al. | 361/695 |

OTHER PUBLICATIONS

USPGPUB 2002/0134531 A1, Sep. 19, 2001, Yanagida.*
USPGPUB 2003/0067224 A1, Sep. 6, 2001, Tai.*

* cited by examiner

*Primary Examiner*—G. Tolin

(57) ABSTRACT

A high efficiency heat dissipated power supply comprises a base and a cover. The base receives power from a plug at a rear side thereof. The voltage of power is reduced, and is rectified by an electronic circuit for being used by a computer mainframe. A bank of fans are installed at a rear side of the base so that the fan absorbs air between the cover and base; and then guide the air to blow out the air. An interior of the cover has at least one cover fan. The cover fans are actuated by a power source. Then the air is exhausted by an exhausting fan at a rear side of the base. Thereby, air flows along three paths so that convection air is formed at the interior and exterior of the power supply; as a result heat dissipating efficiency is increased so that capacity and output power are increased.

2 Claims, 7 Drawing Sheets

HIGH EFFICIENCY HEAT DISSIPATED POWER SUPPLY

FIELD OF THE INVENTION

The present invention relates to power supplies, and particularly to high efficiency heat dissipated power supply which provides larger capacities and preferred heat dissipating ability.

BACKGROUND OF THE INVENTION

Currently, more and more components are connected to a computer, such as optic disk drives, built-in modems, printers, network cards, interface cards, etc. Moreover, the speeds of computers, such as CPUs, CD drives are increased rapidly, for example, Intel Pentium 4 and AMD K7 have speeds over 2GHz. These all cause that more power is required and much heat is dissipated. Thereby, more and more fans are installed for heat dissipation. As a result more than one power supplies are used in one computer mainframe.

Referring to FIG. 1, one prior art design is illustrated. In that, two power supplies P1, and P2 are overlapped. The two power supplies are connected in parallel by connectors and are placed in one frame for increasing output power.

In another prior art, a hollow casing A is formed, which has two receiving spaces each for receiving respective power sources.

However, above mentioned prior arts will cause that a larger space is necessary and the cost is doubled. Moreover, the problem of heat dissipation is not resolved.

SUMMARY OF THE INVENTION

Accordingly, the primary object of the present invention is to provide a high efficiency heat dissipated power supply which comprises a base and a cover. The base receives power from a plug at a rear side thereof. Voltage of the power is reduced and rectified by an electronic circuit for being used by a computer mainframe. A bank of fans are installed at a rear side of the base so that the fan absorbs air between the cover and base; and then guide the air to blow out. An interior of the cover has at least one cover fan. The cover fans are actuated by a power source. Outer air is absorbed by the fan and then flows into the cover to blow the electronic circuit. Then the air is exhausted by an exhausting fan at a rear side of the base. Thereby, air flows along three paths so that convection air is formed at the interior and exterior of the power supply; as a result heat dissipating efficiency is increased so that capacity and output power are increased.

The various objects and advantages of the present invention will be more readily understood from the following detailed description when read in conjunction with the appended drawing.

DETAILED DESCRIPTION OF THE PREFERRED EMBODIMENTS

Figure 1:
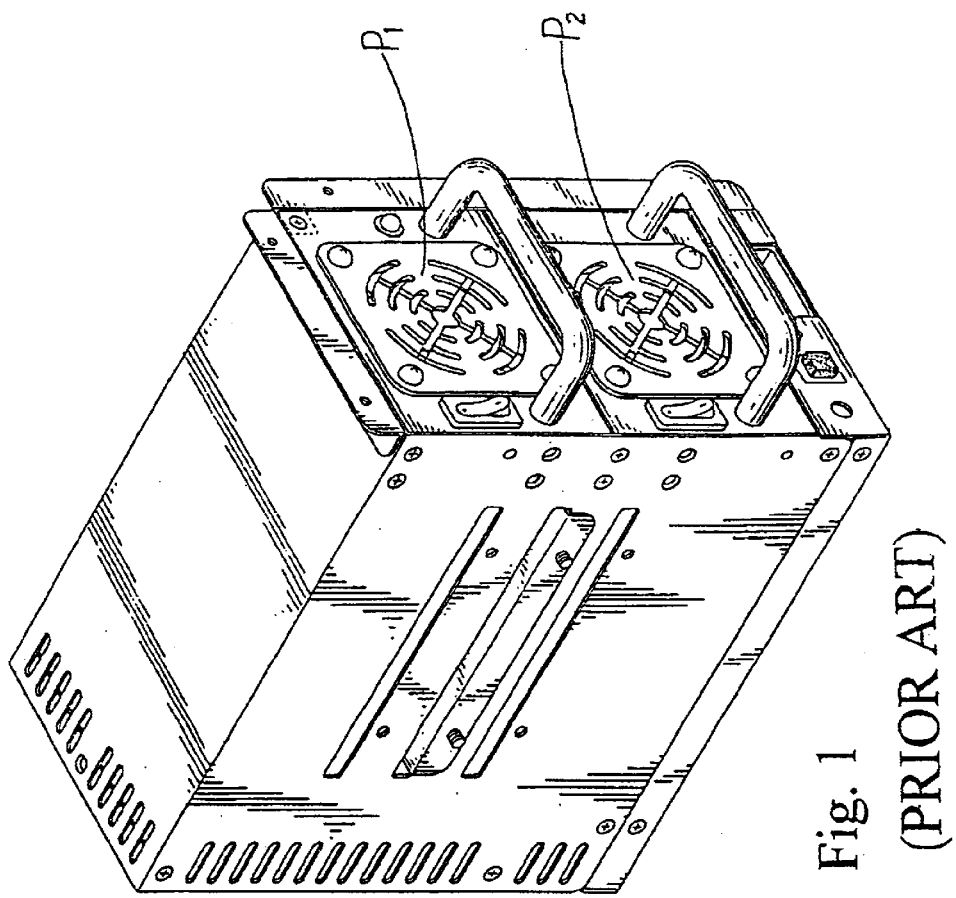
FIG. 1 is a perspective view of a prior art power supply.
Figure 2:
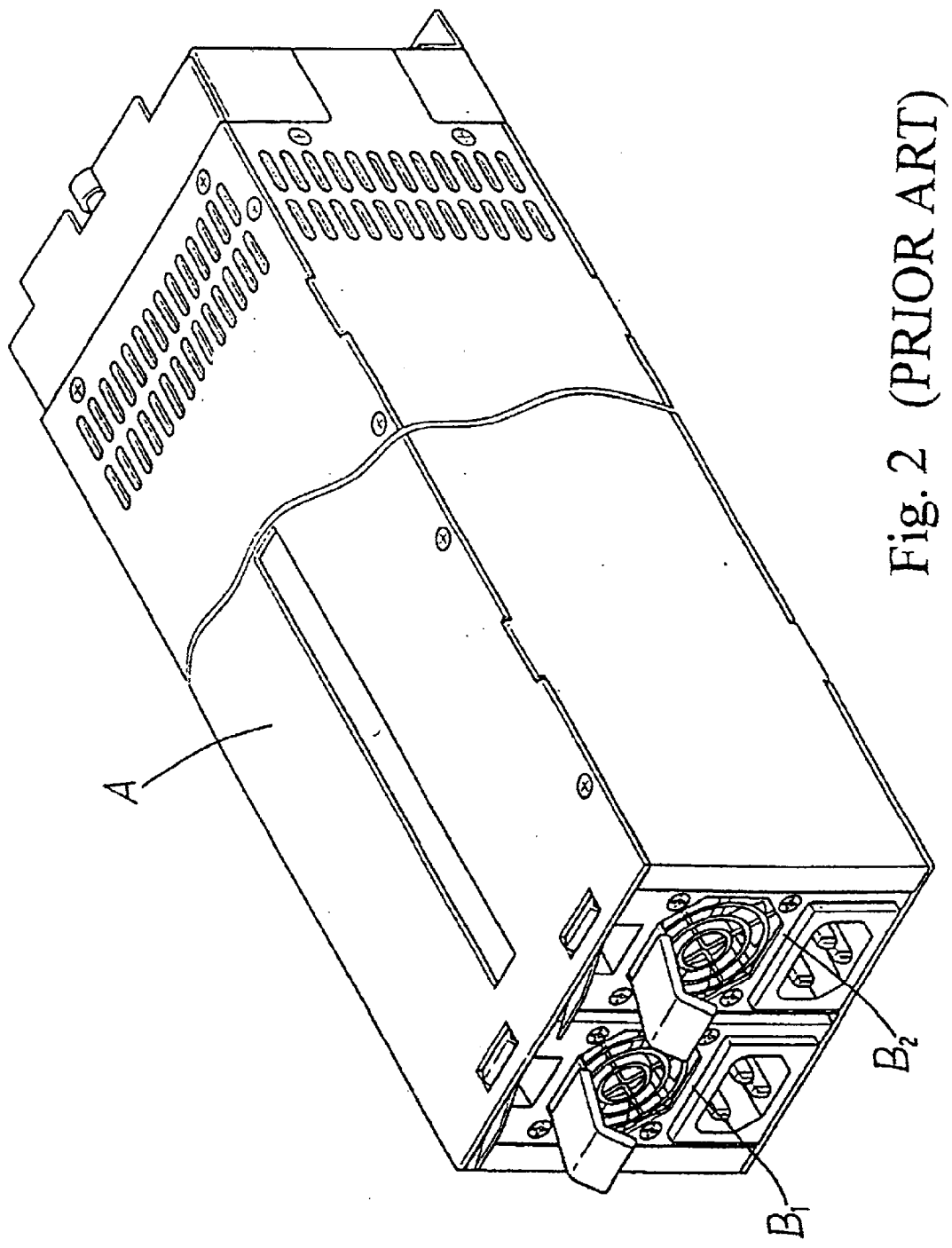
FIG. 2 is a perspective view of another prior art power supply.
Figure 3:
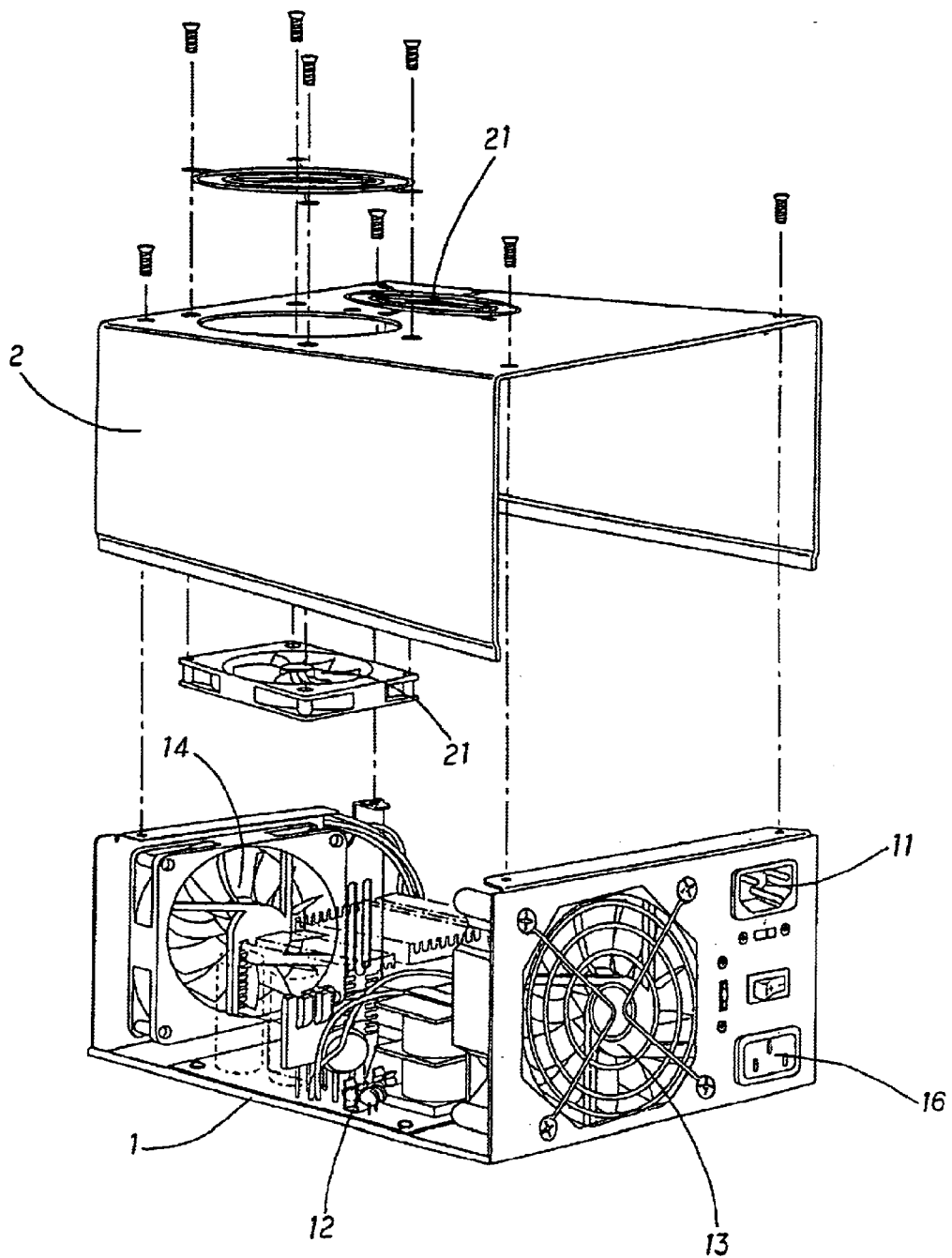
FIG. 3 is an exploded perspective view of the present invention.
Figure 4:
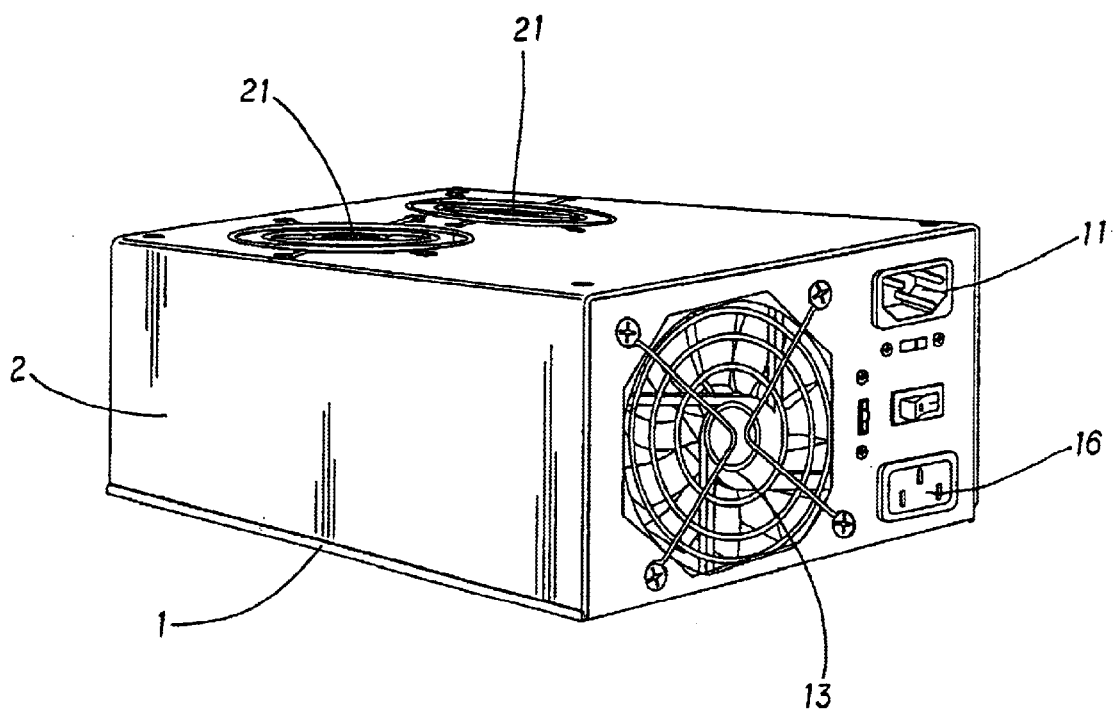
FIG. 4 is a perspective view of the present invention.

Referring to FIGS. 2 to 4, the power supply of the present invention is illustrated. The power supply includes a base 1 and a cover 2. The base 1 receives power from a plug 11 at a rear side thereof. The voltage of power is reduced and rectified by an electronic circuit 12 for being used by a computer mainframe (not shown). A bank of fans 13 are installed at a rear side of the base 1 so that the fan 13 can absorb the interior air thereof and then guide the air to blow it out. An interior of the cover 2 has at least one cover fan 21, in the drawing, two fans are illustrated. The cover fans 21 are actuated by a power source. Outer air is absorbed by the fan 21 and then flows into the cover to blow it to the electronic circuit 12. Then the air is exhausted by an exhausting fan 13 at a rear side of the base 1. A front end of the base 1 is installed with a suction fan 14. The suction fan 14, the exhausting fan 13 and the cover fan 2 in the cover 2 are formed as a fan group. Thereby, air flows along three paths so that convection air is formed at the interior and exterior of the power supply. As a result heat dissipating efficiency is increased so that capacity and output power are increased.

Figure 5:
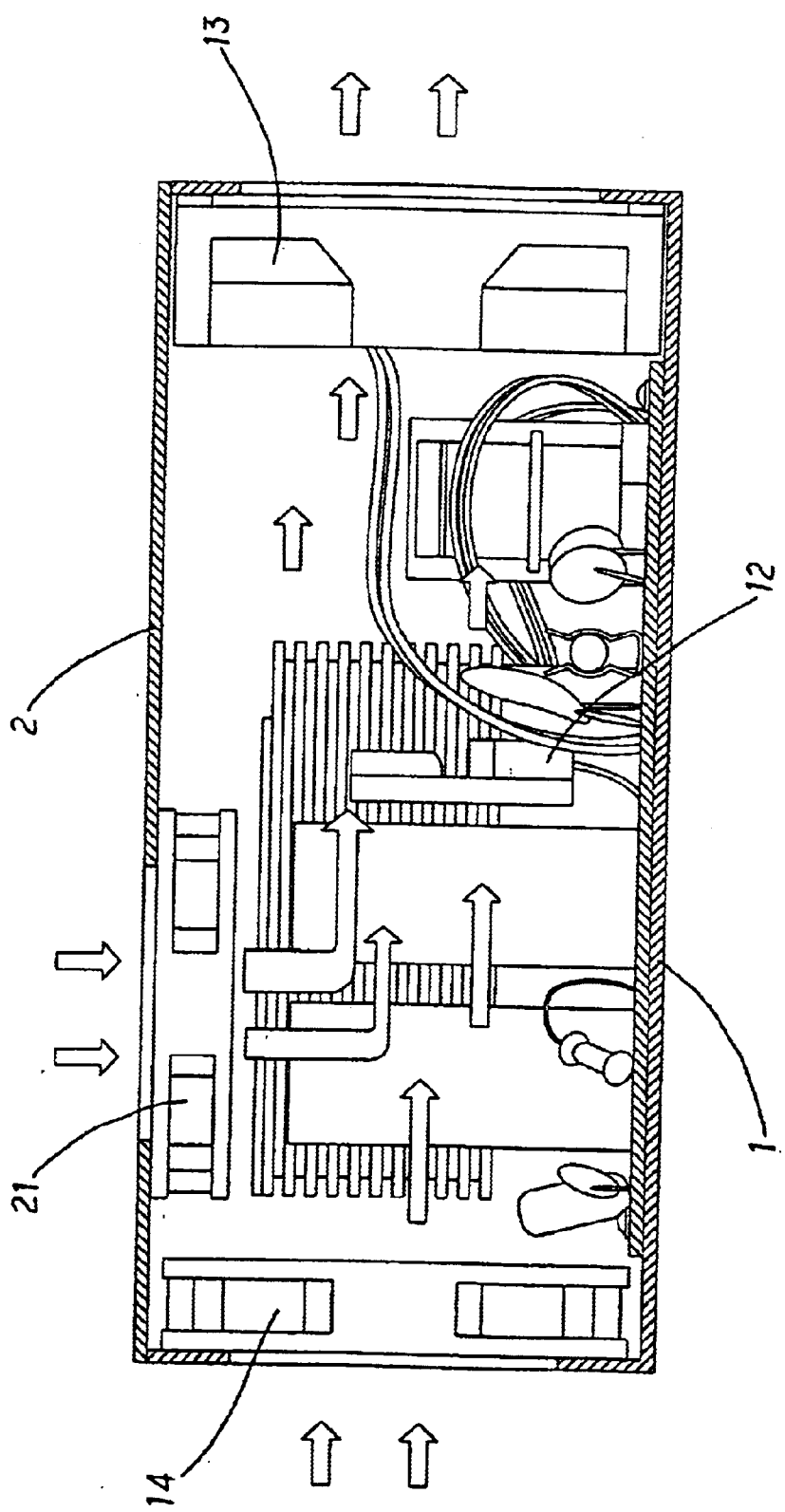
FIG. 5 is a schematic view showing the guiding of airflow of the present invention.
Figure 6:
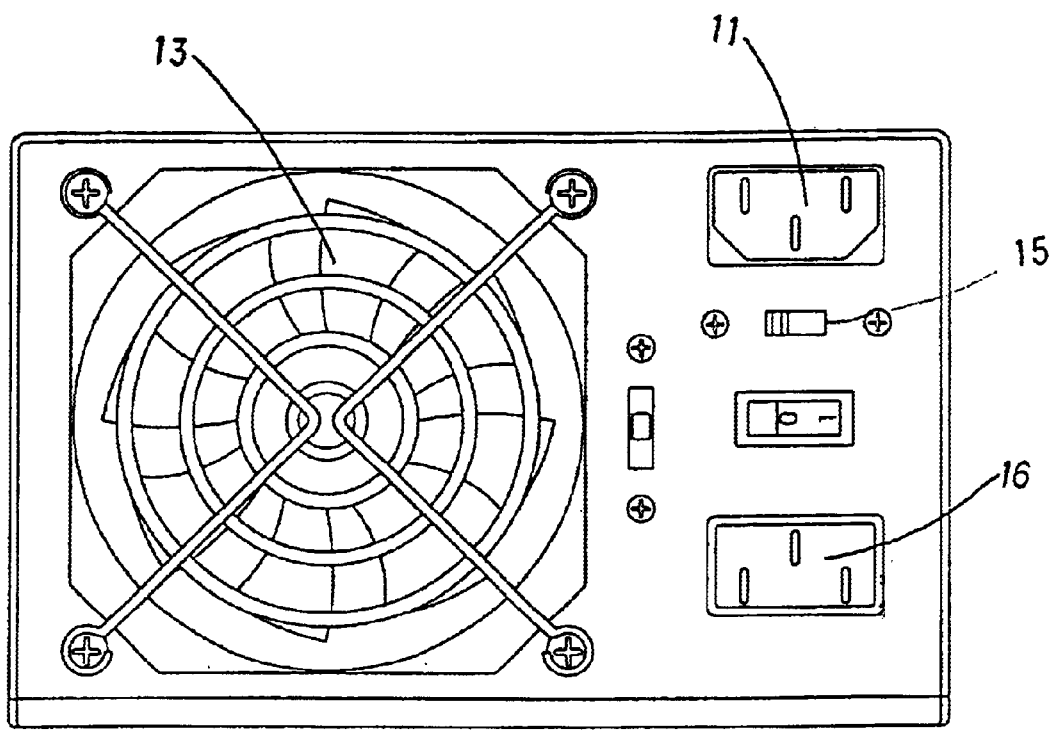
FIG. 6 shows the arrangement of the rear side of the base of the present invention.
Figure 7:
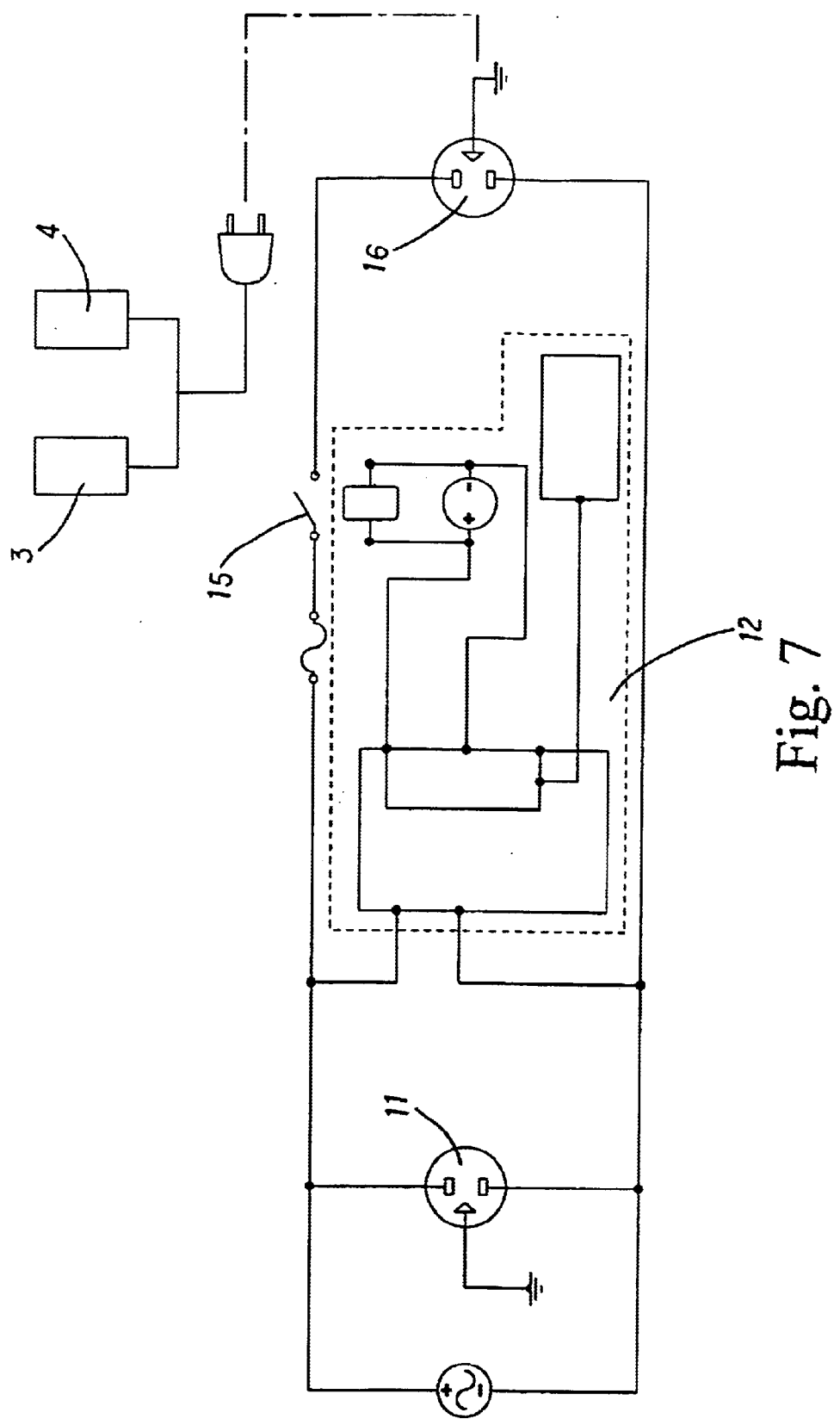
FIG. 7 is a circuit diagram showing the connection of the plug and receptacle of the present invention.

Referring to FIGS. 5 and 6, a receptacle 16 at a rear side of the base 1 and an electronic switch 15 are connected to a plug 11. When the power supply supplies power to a computer mainframe and the mainframe is actuated, the receptacle 16 can transfer power to the connected peripherals 3, such as a screen, a printer, etc. or the power is transferred to another receptacle 4. When the mainframe is closed, the electronic switch 15 can be operated so that the receptacle 16 is opened (not actuated) so that the power cannot flow through the receptacle 16. Thereby, no power is transferred. Thus, the power supply has the function of further transferring power and by turning on or off the computer mainframe, output of power can be switched automatically.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A high efficiency heat dissipated power supply comprising
   a base and a cover; the base receiving power from a plug at a rear side thereof; the voltage of the power being reduced and rectified by an electronic circuit on the base for being used by a computer mainframe;
   an exhausting fan installed at a rear side of the base so that the fan moves air between the cover and base; and then causes the air to flow out;
   at least one cover fan installed in an interior of the cover; the at least one cover fan being actuated by a power source; outer air being absorbed by the cover fan and then flowing into the cover to blow the air to the electronic circuit; then the air is exhausted by the exhausting fan at the rear side of the base; thereby, air flows so that convection air is formed at the interior and exterior of the power supply;

a front fan at a front end of the base; the front fan being a suction fan; the exhausting fan, the front fan and the cover fan in the cover being formed as a fan group;

wherein the plug is connected to a receptacle at a rear side of the base through an electronic switch; when the power supply supplies power to a computer mainframe and the computer mainframe is actuated, the receptacle transfers power to a connected peripheral or another receptacle through an extension line; and wherein when the mainframe is closed, the electronic switch is operated so that the receptacle is turned off and thus the power does not flow through the receptacle; thereby, no power is transferred; thus, the power supply has the function of transferring power and by turning on or off the computer mainframe, output of power can be switched automatically.

2. The high efficiency heat dissipated power supply as claim in claim 1, wherein the peripheral is one of a screen and a printer.

\* \* \* \* \*